United States Patent [19]

Clark

[11] Patent Number: 4,794,701

[45] Date of Patent: Jan. 3, 1989

[54] LEVEL DEVICE FOR A CHAINSAW

[76] Inventor: Kevin J. Clark, P.O. Box 1038, Harts Village Rd., Millbrook, N.Y. 12545

[21] Appl. No.: 139,818

[22] Filed: Dec. 30, 1987

[51] Int. Cl.$^4$ ............................................. G01C 9/28
[52] U.S. Cl. ...................................... 33/334; 33/390; 33/370; 33/379
[58] Field of Search ................. 33/379, 381, 382, 390, 33/370-373, 334, 365, 333

[56] References Cited

U.S. PATENT DOCUMENTS

| | | | |
|---|---|---|---|
| 544,587 | 8/1895 | Moore | 33/390 X |
| 777,641 | 12/1904 | Knighton | 33/390 |
| 1,166,045 | 12/1915 | Gethmann | 33/379 X |
| 1,204,968 | 11/1916 | Hommel | 33/390 |
| 1,362,813 | 12/1920 | Neidl | 33/381 X |
| 2,194,995 | 3/1940 | Berquist | 33/379 X |
| 2,584,917 | 2/1952 | Powell | 33/377 |
| 3,664,032 | 5/1972 | Tompkins | 33/334 |
| 4,292,741 | 10/1981 | Scandella | 33/379 |
| 4,295,279 | 10/1981 | Sienknecht | 33/334 |
| 4,545,129 | 10/1985 | Stone | 33/390 |

FOREIGN PATENT DOCUMENTS 483930 4/1938 United Kingdom ................. 33/381

Primary Examiner—Harry N. Haroian
Attorney, Agent, or Firm—Jerry T. Kearns

[57] ABSTRACT

A level device for a chainsaw is formed from a hollow closed transparent plastic tube filled with a colored liquid. An air bubble is trapped in the liquid within the tube. Alignment indicia in the form of perpendicular intersecting lines are inscribed on the cylindrical side wall of the tube and on both end faces. An aluminum mounting bracket consists of a pair of spaced circular rings connected by a strut. A standard extends perpendicular to the strut, and is attached thereto at a point equidistant from each of the rings. A slotted mounting prong is formed at the free end of the standard for engagement with a threaded fastener on a chainsaw. In use, the device functions as a spirit level for making horizontal and vertical cuts with the blade of the chainsaw.

2 Claims, 3 Drawing Sheets

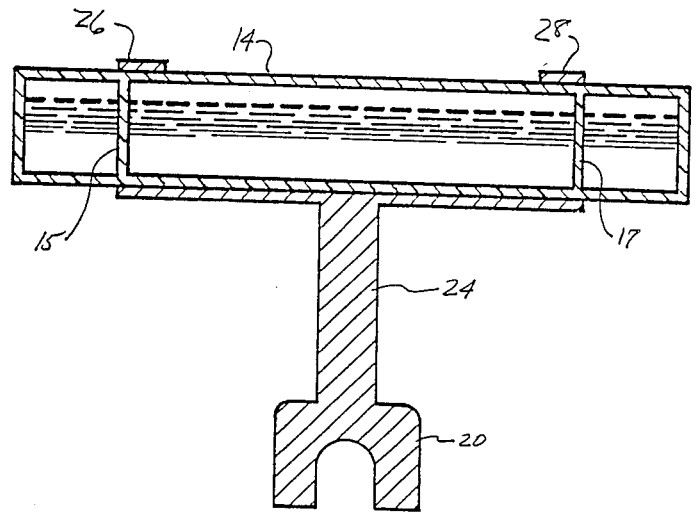
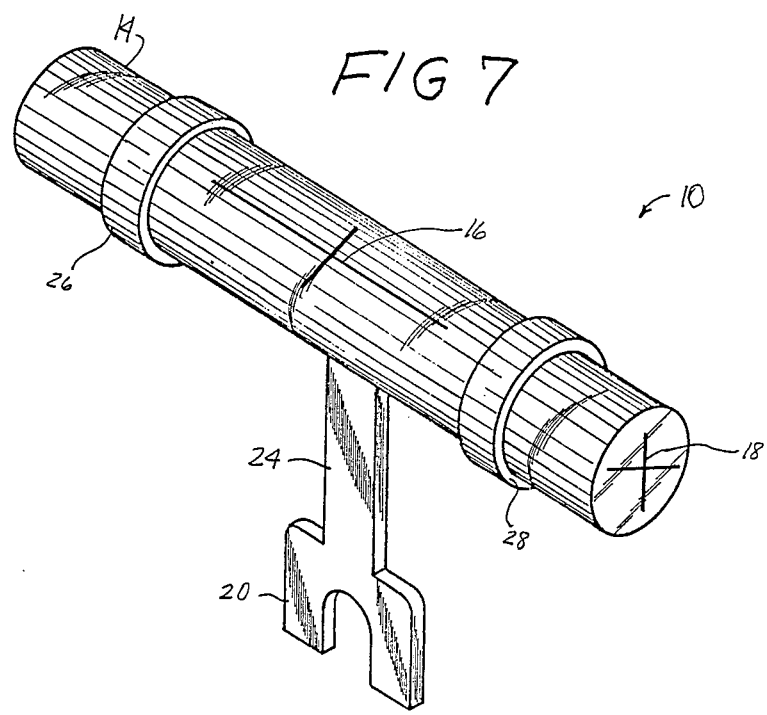

LEVEL DEVICE FOR A CHAINSAW

BACKGROUND OF THE INVENTION

1. Field of the Invention

The present invention relates to level devices, and more particularly pertains to a new and improved level device for use with chainsaws. When an individual is making a cut with a chainsaw, it is difficult to maintain the blade of the saw in the proper orientation with the workpiece. Particularly when making a horizontal cut low to the ground, there is a tendency to dig the tip of the chainsaw blade into the ground, thus increasing the possibility of a dangerous kick back. In order to overcome these problems, the present invention provides a spirit level with a mounting bracket designed for attachment to a chainsaw. Through the use of this device, the chainsaw operator may easily determine the orientation of the chainsaw blade.

2. Description of the Prior Art

Various types of level devices are known in the prior art. A typical example of such a level device is to be found in U.S. Pat. No. Des. 34,017, which issued to F. Farwell on Jan. 29, 1901. This patent discloses an inclinometer having an arcuate casing with a sight glass adjacent a graduated scale. U.S. Pat. No. Des. 104,124, which issued to A. Ward on Apr. 13, 1937, discloses a level device which utilizes an arcuate sight glass provided with an adjacent graduated scale and a mounting ring. U.S. Pat. No. Des. 171,317, which issued to H. Von Duyke on Jan. 19, 1954, discloses a spirit level formed from a metal strip provided with U-shaped recesses at each end thereof. U.S. Pat. No. Des. 182,773, which issued to E. Souter on May 13, 1958, discloses a spirit level having individual spirit levels on top and side walls of a rectangular block. The rectangular block is provided with an elongated leg and a central circular aperture is formed through the rectangular block. U.S. Pat. No. Des. 192,302, which issued to T. Fulton on Feb. 27, 1962, discloses a level device for use as a drill centering gauge which is provided with individual transversely oriented spirit levels. U.S. Pat. No. Des. 238,153, which issued to V. Johnson et al on Dec. 23, 1975, discloses a level device provided with transversely oriented spirit levels and an elongated graduated scale. U.S. Pat. No. Des. 242,231, which issued to P. Shaffer on Nov. 9, 1976, discloses a clip-on level for portable electric drills which is provided with two independent transversely oriented spirit levels. The level device is provided with a generally circular mounting clip with elongated slotted side walls.

While the above mentioned devices are suited for their intended usage, none of these devices provide a spirit level suitable for attachment to a chainsaw. Additionally, none of the aforesaid devices provide a tubular spirit level with a mounting bracket comprising a pair of spaced rings secured by a connecting strut to a transversely extending standard having a slotted pronged end for engagement with a threaded fastener on a chainsaw. Inasmuch as the art is relatively crowded with respect to these various types of level devices, it can be appreciated that there is a continuing need for and interest in improvements to such level devices, and in this respect, the present invention addresses this need and interest.

SUMMARY OF THE INVENTION

In view of the foregoing disadvantages inherent in the known types of level devices now present in the prior art, the present invention provides an improved level device for a chainsaw. As such, the general purposes of the present invention, which will be described subsequently in greater detail, is to provide a new and improved level device for a chainsaw which has all the advantages of the prior art level devices and none of the disadvantages.

To attain this, a representative embodiment of the concepts of the present invention is illustrated in the drawings and makes use of a level device for a chainsaw which is formed from a hollow closed transparent plastic tube filled with a colored liquid. An air bubble is trapped in the liquid within the tube. Alignment indicia in the form of perpendicular intersecting lines are inscribed on the cylindrical side wall of the tube and on both end faces. An aluminum mounting bracket consists of a pair of spaced circular rings connected by a strut. A standard extends perpendicular to the strut, and is attached thereto at a point equidistant from each of the rings. A slotted mounting prong is formed at the free end of the standard for engagement with a threaded fastener on a chainsaw. In use, the device functions as a spirit level for making horizontal and vertical cuts with the blade of the chainsaw.

There has thus been outlined, rather broadly, the more important features of the invention in order that the detailed description thereof that follow may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved level device for a chainsaw which has all the advantages of the prior art level devices and none of the disadvantages.

It is another object of the present invention to provide a new and improved level device for a chainsaw which may be easily and efficiently manufactured and marketed.

It is a further object of the present invention to provide a new and improved level device for a chainsaw which is of a durable and reliable construction.

An even further object of the present invention is to provide a new and improved level device for a chainsaw which is susceptible of a low cost of manufacture with regard to both materials and labor, and which accordingly is then susceptible of low prices of sale to the consuming public, thereby making such level devices economically available to the buying public.

Still yet another object of the present invention is to provide a new and improved level device for a chainsaw which provides in the apparatuses and methods of the prior art some of the advantages thereof, while simultaneously overcoming some of the disadvantages normally associated therewith.

Still another object of the present invention is to provide a new and improved level device for a chainsaw which will assist the operator in determining the orientation of the saw blade.

Yet another object of the present invention is to provide a new and improved level device for a chainsaw with a mounting bracket specifically designed for quick attachment to a chainsaw.

Even still another object of the present invention is to provide a new and improved level device for a chainsaw which utilizes a hollow cylindrical tube filled with a colored liquid having a trapped air bubble and provided with alignment indicia on a cylindrical side wall and on both end faces of the tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross sectional view, taken along line 6—6 of FIG. 2, illustrating the interior of the hollow tube of the level device of the present invention.

FIG. 7 is a perspective view illustrating the level device of the present invention.

DESCRIPTION OF THE PREFERRED EMBODIMENT

Figure 1:
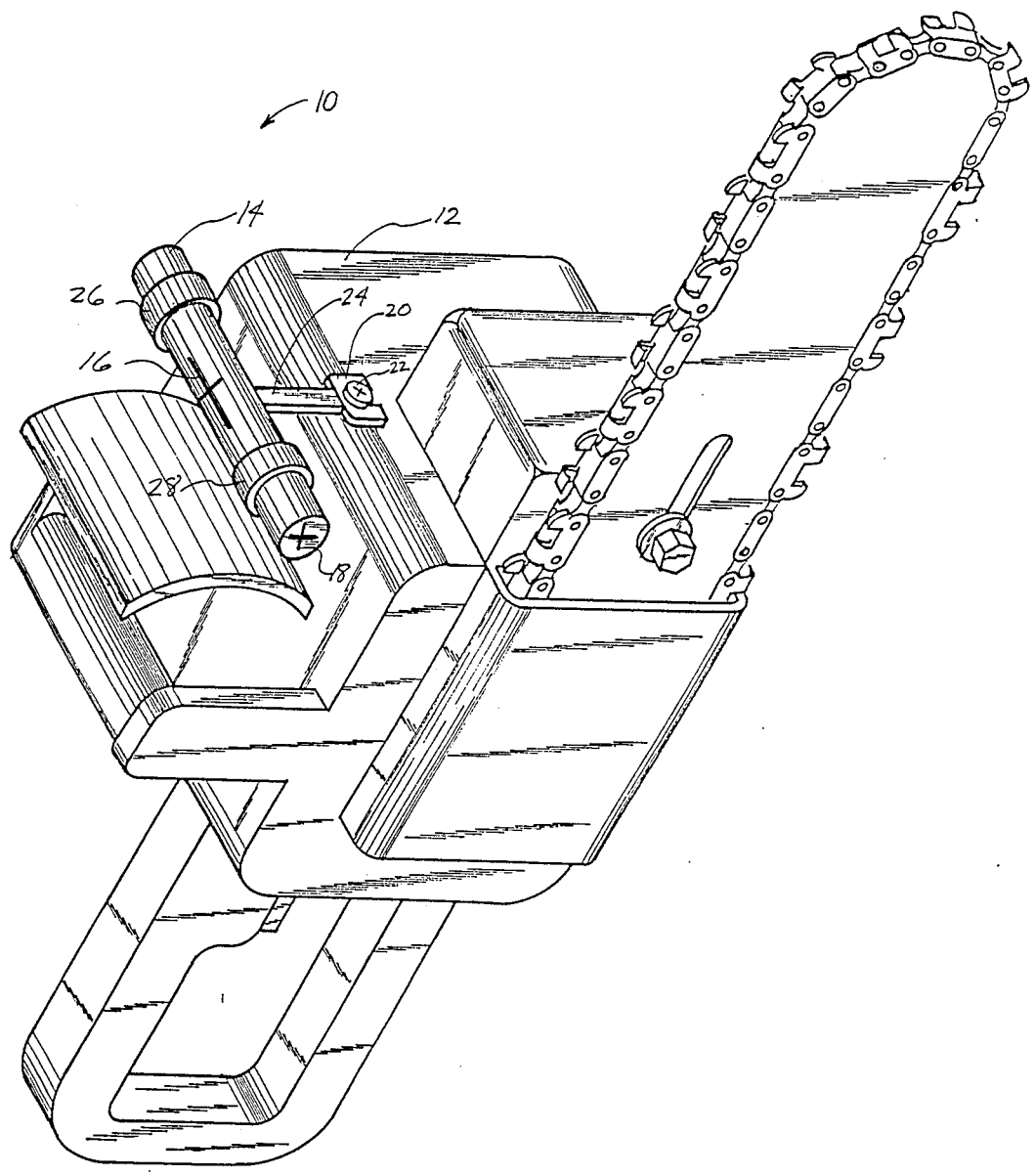
FIG. 1 is a perspective view of the level device of the present invention mounted on a conventional chainsaw.

With reference now to the drawings, and in particular to FIG. 1 thereof, a new and improved level device for a chainsaw embodying the principles and concepts of the present invention and generally designated by the reference numeral 10 will be described.

More specifically, it will be noted that the first embodiment 10 of the invention includes a closed hollow cylindrical tube 14 which is attached to a conventional chainsaw 12. A first alignment indicia 16 in the form of perpendicular intersecting lines is imprinted on the cylindrical side wall of the tube 14. Additional indicia 18 are imprinted on both end faces of tube 14. The tube 14 is preferably formed from a transparent plastic material and is filled with a colored liquid. An air bubble is trapped within the tube 14 along with the liquid. Thus, the hollow tube 14 forms a spirit level. A fluid having anti-freeze properties such as alcohol is preferred for use in the level device 10 of the present invention. A mounting standard 24 has a pronged end 20 for engagement with a threaded fastener 22 in the housing of the chainsaw 12. A pair of circular rings 26 and 28 are frictionally engaged around the tube 14. The mounting standard 24 is attached at a point equidistant each of the rings 26 and 28. The mounting bracket components are preferably formed from aluminum.

Figure 2:
FIG. 2 is a side view of the hollow tube of the level device of the present invention.

In FIG. 2, a side view is provided which illustrates the alignment indicia 16 imprinted on the cylindrical side wall of the tube 14.

Figure 3:
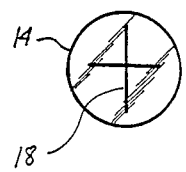
FIG. 3 is an end view of the hollow tube of the level device of the present invention.

In FIG. 3, an end view of the tube 14 is provided, illustrating the alignment indicia 18 imprinted on the end face of the tube 14.

Figure 4:
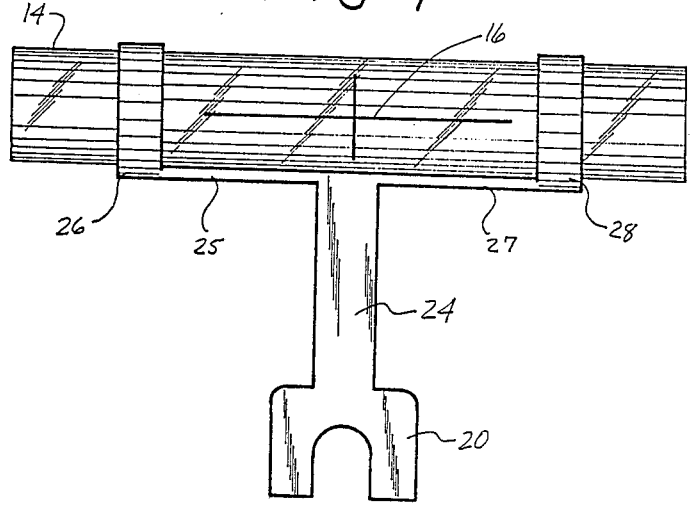
FIG. 4 is a side view illustrating the mounting bracket of the level device of the present invention.

As shown in FIG. 4, a connecting strut 25 extends between the rings 26 and 28. The mounting standard 24 extends transversely to the connecting strut portions 25 and 27 and is attached thereto at a midpoint, equidistant from each of the rings 26 and 28. A pronged end 20 is formed at a free end of the mounting standard 24. The pronged end 20 has a slot for engagement with a conventional threaded fastener on the housing of the chainsaw. To attach the level device 10 of the present invention to the chainsaw, it is merely necessary to slightly loosen the threaded fastener and slip the pronged end 20 beneath the head of the threaded fastener and then to tighten the fastener. The level device 10 will then be ready for use.

Figure 5:
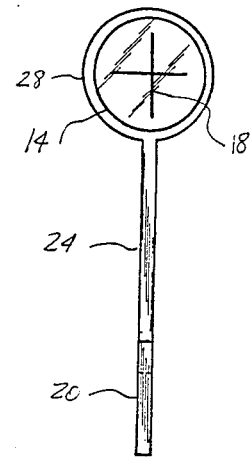
FIG. 5 is an end view illustrating the hollow tube and attached mounting bracket of the level device of the present invention.

In FIG. 5, an end view is provided which illustrates the mounting bracket attached to the hollow tube 14.

In FIG. 6, a cross sectional view of the hollow tube 14 is provided. The tube 14 may be formed with a single fluid chamber along the entire length of the tube 14, or as illustrated, may be provided with two partitioned walls 15 and 17 which extend transversely to a longitudinal axis of the tube 14. By virtue of this construction, a separate compartment is provided adjacent each end face of the tube 14, and an elongated central fluid compartment is provided near the central portion of the tube 14. The advantage of utilizing multiple fluid compartments is that the size of the air bubbles adjacent the end faces of the tube 14 may be smaller than the air bubbles disposed in the central fluid compartment, thus providing a greater degree of accuracy.

In FIG. 7, a perspective view is provided which illustrates the level device 10 of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved level device for attachment to a threaded fastener on a housing of a chainsaw, comprising:
   a closed hollow cylindrical tube formed from a transparent plastic material and having flat, circular opposite end faces connected by a cylindrical sidewall;
   alignment indicia on each of said opposite end faces and on said cylindrical side wall of said tube;
   each of said alignment indicia comprising perpendicular intersecting lines;
   an aluminum mounting bracket on said tube for attaching said tube to a chainsaw;
   said mounting bracket comprising a pair of spaced cylindrical rings frictionally engaged around said tube;
   a connecting strut extending between said rings;
   a mounting standard transversely connected to said connecting strut at a point equidistant from each of said rings;
   a slotted prong formed at a free end of said standard for engagement with a threaded fastener on a housing of said chainsaw;
   said tube divided into three fluid compartments by two spaced partitioned walls extending transversely to a longitudinal axis of said tube; and,
   each of said compartments being filled with a colored fluid containing a trapped air bubble.

2. In combination with a chainsaw having a housing and an elongated blade, the improvement comprising:
   a closed hollow cylindrical tube formed from a transparent plastic material and having flat, circular opposite end faces connected by a cylindrical sidewall;
   alignment indicia on each of said opposite end faces and on said cylindrical side wall of said tube;
   each of said alignment indicia comprising perpendicular intersecting lines;
   an aluminum mounting bracket on said tube attaching said tube to the chainsaw housing;
   said mounting bracket comprising a pair of spaced cylindrical rings frictionally engaged around said tube;
   a connecting strut extending between said rings;
   a mounting standard transversely connected to said connecting strut at a point equidistant from each of said rings;
   a slotted prong formed at a free end of said standard in engagement with a threaded fastener on the housing of said chainsaw;
   said tube divided into three fluid compartments by two spaced partitioned walls extending transversely to a longitudinal axis of said tube;
   said tube having a longitudinal axis extending perpendicular to said chainsaw blade; and,
   each of said compartments being filled with a colored fluid containing a trapped air bubble.

* * * * *